Sept. 22, 1959 J. O. PREISIG ET AL 2,905,853
HIGH VOLTAGE SUPPLIES
Filed May 7, 1954
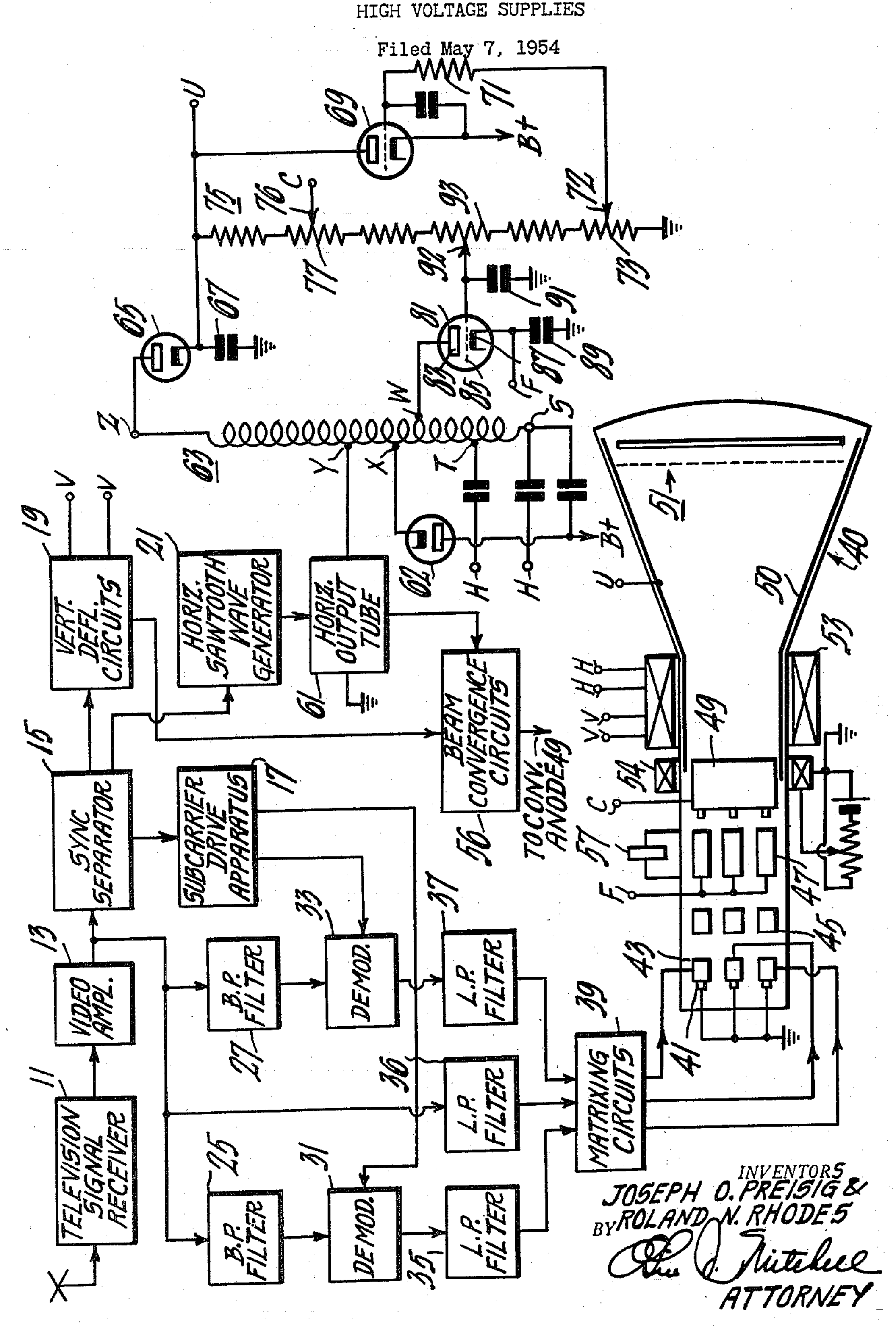
INVENTORS
JOSEPH O. PREISIG &
BY ROLAND N. RHODES
ATTORNEY United States Patent Office 2,905,853

Patented Sept. 22, 1959

2,905,853

HIGH VOLTAGE SUPPLIES

Joseph O. Preisig, Trenton, and Roland N. Rhodes, Levittown, N.J., assignors to Radio Corporation of America, a corporation of Delaware Application May 7, 1954, Serial No. 428,248

17 Claims. (Cl. 315—15)

This invention relates generally to voltage supplies and more particularly to voltage supplies of a type suitable for satisfying the high voltage requirements of a cathode ray tube.

It has become more or less a general practice in the monochrome television art to obtain the high voltage required for the final accelerating electrode of a monochrome receiver's kinescope (and the voltage for the focus electrode, where electrostatic beam focusing is employed) from a pulse type supply. In such pulse type supplies, the high voltages are usually developed through rectification of the high amplitude transient "flyback" voltage pulses appearing across the receiver's horizontal output transformer during retrace periods of the line scanning cycles, when cutoff of the horizontal output tube causes a sudden collapse of the magnetic field in the horizontal deflection yoke. One or two diode rectifiers are generally all that are required for the high voltage needs of a black-and-white kinescope, one to develop the focusing voltage, where focus control is electrostatic, and one to develop the higher final anode voltage.

In color kinescopes of the types presently contemplated, however, the high voltage requirements are greater in magnitude, more critical as to regulation, and over all present a significantly more complex problem than the monochrome kinescope supplies. A particular supply requirement, that is of more significant importance in color receivers as contrasted with monochrome receivers, is the necessity of maintaining the ratio of focus voltage to final anode (ultor) voltage essentially constant, independent of load or source voltage changes. Direct adaptation of a conventional monochrome high voltage supply does not provide a color kinescope high voltage supply which satisfactorily performs this requisite "tracking" function. The present invention is directed toward a voltage supply suitable for use in satisfying the high voltage requirements of a color kinescope with excellent tracking performance between two supplied voltages which may serve as the aforementioned focus and ultor voltages.

In accordance with an embodiment of the present invention, the usual focus rectifying diode is supplanted by a tube having a control grid, such as a triode. Control voltage for the control grid of the focus triode is made sensitive to ultor voltage changes. Essentially constant ratio tracking between focus and ultor voltages is thus maintained, irrespective of changes in current drawn from the ultor supply, changes in current drawn from the focus supply, changes in flyback pulse amplitude, tube characteristic variations, or drifts in flyback transformer constants causing changes in ratio of derived flyback pulses.

Accordingly, it is a primary object of the present invention to provide a novel and improved voltage supply of a type suitable for satisfying the high voltage requirements of a cathode ray tube.

It is a further object of the present invention to provide a novel and improved high voltage supply for a color television receiver.

It is an additional object of the present invention to provide a novel and improved self-regulated kinescope focus voltage supply.

It is another object of the present invention to provide a novel and improved color kinescope high voltage supply wherein essentially constant-ratio tracking between the supplied focus and ultor voltages is maintained.

While embodiments of the present invention may be applicable to a variety of voltage supplies wherein it is desired to provide accurate tracking between two supply voltages, a particularly likely use of the principles of the present invention is in high voltage supplies for color television receivers. Therefore, an embodiment of the invention has been schematically illustrated in the drawing as supplying the high voltages required by a color television receiver. Objects and advantages of the present invention other than those previously mentioned may be gleaned from an inspection of the aforesaid accompanying drawing and a reading of the following detailed description.

The illustrated receiver is generally representative of presently contemplated color receivers for a simultaneous subcarrier type color television system in accordance with the revised FCC color standards, and is in general accord with the principles and apparatus discussed in the article entitled "Principles and Development of Color Television Systems," by G. H. Brown and D. G. C. Luck appearing in the June 1953 issue of the RCA Review. Carrier waves modulated by a composite color picture signal are illustrated as being received by conventional signal receiving apparatus 11, which may include the usual RF tuner, converting apparatus, IF amplifier, signal detector, etc. The video frequency signals recovered from the modulated carrier in the receiving apparatus 11 are amplified in the video amplifier 13. Synchronizing information is derived from the recovered signals in the sync separator 15 and utilized to synchronously control the receiver's subcarrier drive apparatus 17, to control the generation of vertical scanning waves in the vertical deflection circuits 19, and control the generation of horizontal frequency sawtooth voltage waves in the horizontal sawtooth wave generator 21.

Respective color mixture signals (e.g. narrow band $E_Q$ signals and wider band $E_I$ signals, discussed in detail in the aforementioned article) are recovered from the video signal output of amplifier 13 in respective color demodulator channels which include bandpass filters 25 and 27 of respectively appropriate passbands, synchronous demodulators 31 and 33 receiving respectively appropriate phases of the output of the subcarrier drive apparatus 17, and low pass filters 35 and 37 having the respectively appropriate narrow and wider responses. The receiver is also provided with a brightness channel, including a low pass filter 36 having the desired wide band response, through which the broad band monochrome portion of the composite picture signal may pass. The outputs of the brightness channel and two color channels are suitably combined in the matrixing circuits 39 of the receiver to obtain the simultaneous color signals which may be applied to appropriate beam control elements of the color image reproducer 40.

The color image reproducer 40 is illustrated schematically as one of the three-gun, shadow-mask kinescope type. Color image reproducers of this general type are discussed in some detail in the article by H. B. Law entitled "A Three-Gun Shadow-Mask Kinescope," appearing in the October 1951 issue of the Proceedings of the I.R.E. In a color image reproducer of this type, three electron beams are used, one for each primary color. The beams strike a phosphor screen composed of a regular array of red-, green-, and blue-emitting phosphor dots. Between the electron gun position and the phosphor screen there is placed a thin perforated metal sheet for the purpose of partially masking the electron beams. The phosphor dot array on the screen comprises a plurality of closely spaced phosphor dot trios, each trio consisting of a red-, green-, and blue-emitting phosphor dot with the centers of the dots lying at the corners of an equilateral triangle. The trios themselves lie at the corners of an equilateral triangle of larger size. Associated with each of the phosphor trios is a hole in the video mask, these holes also being located at the corners of an equilateral triangle. The three beams, disposed 120° apart about the tube axis, are converged to a point on the mask by suitable static and dynamic beam converging means. The electron beam which is to contribute the red portion of the picture is prevented, by the mask, from striking those areas on the screen containing blue and green emitting phosphors. Likewise the green and blue beams can strike only the green and blue emitting phosphor dots, respectively. The target structure 51 of the illustrative color kinescope 40 may be considered to be of the general shadow-mask type above described.

As schematically illustrated the three electron beams are developed and shaped in respective electron gun structures, each including a thermionic cathode 41, a control grid 43, first anode or accelerating electrode 45, and a focusing electrode 47. The electron gun structures may be of the general type disclosed in the co-pending application of Hannah C. Moodey, Ser. No. 295,225, filed June 24, 1952, and disposed symmetrically about the tube axis such as to produce three substantially parallel beams as in said Moodey application, or may be inclined at respective angles to the tube axis so as to provide three beams substantially converging at a common point on the target, as in co-pending application of Albert M. Morrell, Ser. No. 364,041, filed on June 25, 1953, now U.S. Patent No. 2,752,520, issued June 26, 1956.

A common convergence anode 49 is illustrated, which when energized by suitable dynamic convergence waveforms generated in the beam convergence circuits 56 along with an appropriate (static convergence) D.-C. component, serves to converge the three beams to a common point in the plane of the shadow-mask of target structure 51 throughout the scanning of the raster. The principles of multibeam convergence, and a description of typical circuits for developing dynamic convergence waveforms from sawtooth waves of field and line frequency may be found in an article by Albert W. Friend appearing in the October 1951 issue of the Proceedings of the I.R.E. and entitled "Deflection and Convergence in Color Kinescopes." As illustrated, the beam convergence circuits may derive the respective sawtooth information from the vertical deflection circuits 19 and the horizontal output tube 61, and convert these sawtooth waves into essentially parabolic waveforms, as disclosed in the aforementioned Friend article, for combined application with a D.-C. component as suitable convergence waveforms to the common convergence electrode 49.

While the use of electrostatic convergence apparatus has thus been illustrated, the alternative use of electromagnetic convergence apparatus such as disclosed in the co-pending application of Hunter C. Goodrich, entitled "Electromagnetic Beam Convergence Systems for Tri-color Kinescopes," Ser. No. 322,653, filed November 26, 1952, now U.S. Patent No. 2,707,248, issued April 26, 1955, in the aforesaid co-pending Morrell patent and in another co-pending application of the aforesaid Morrell, Ser. No. 383,340, filed September 30, 1953, and entitled "Tri-color Kinescope," now U. S. Patent No. 2,847,600, issued August 12, 1958. In the aforesaid copending patents, the incorporation of internal pole pieces in such electromagnetic convergence apparatus is disclosed.

Three beam alignment magnets 57, one associated with each of the three electron beams may be employed to provide individual correction of beam misalignment, as disclosed in the aforementioned Friend article. However, where electromagnetic convergence apparatus is employed of the nature providing individual control of the three beams in respective radial directions relative to the tube axis, as in the aforementioned Goodrich and Morrell patents, a single beam alignment magnet providing control of a selected one of the beams in a direction perpendicular to the radial convergence control direction associated with that beam is sufficient, again as indicated in the aforementioned Goodrich and Morrell patents. In such a case the single beam alignment magnet may take the form of an adjustably insertable magnet associated with cooperating external and internal pole pieces, as disclosed in the copending application of Max Obert, Ser. No. 405,445, filed January 21, 1954, and entitled "Electron Beam Control Means," now U.S. Patent No. 2,769,110, issued October 30, 1956.

In addition to the beam controlling apparatus already described, the illustrated color kinescope 40 is also provided, as is generally customary, with a "color purity" yoke 54, applying a uniform transverse magnetic field to all the electron beams to orient the system of beams as desired. The yoke may comprise either a rotatable single pair of coils, or two fixed pairs of coils at right angles, fed from an adjustable source of D.-C. (as indicated on the drawing). The use of such a "purity coil" to deflect the three beams equally so that they may be adjusted to pass through their respective color centers is explained in greater detail in the aforesaid Friend article, and in the co-pending application of Friend, Ser. No. 202,185, filed December 22, 1950, and entitled "Beam Alignment Device," now U.S. Patent No. 2,719,249, issued August 19, 1955.

The kinescope is provided, as is conventional, with a final accelerating electrode, the ultor 50, which may take the usual form of a conductive coating on the inner surface of the kinescope 40 extending from the vicinity of the convergence electrode 49 to the beam target structure 52. Where the flared portion of the kinescope envelope is itself a conducting metal, the conductive coating need only extend forward sufficiently to make electrical contact with the metal flared portion.

To effect deflection of the three beams to trace a scanning raster on the target structure 51, a deflection yoke 53 is provided with appropriately disposed horizontal and vertical deflection windings. The yoke 53 is illustrated as having vertical yoke terminals V—V, to which field frequency scanning waves developed in the vertical deflection circuits 19 are applied. The horizontal yoke terminals H—H derive line frequency scanning waves from the horizontal output transformer 63, energized by a current developed in the horizontal output tube 61 to provide the desired scanning sawtooth in the horizontal yoke. The illustrated horizontal output transformer 63 is of the autotransformer type, the output of the horizontal output tube 61 being applied across a selected portion of the total series of windings, and the horizontal yoke being effectively coupled across a smaller segment of this portion. The driving connection of output tube 61 to the transformer 63 is illustrated as being at an intermediate point "Y," while the yoke connections are illustrated at lower potential terminals "S" and "T" on the transformer 63. The conventional damper tube 62 is illustrated as having its cathode connected to transformer 63 at point "X," intermediate points "T" and "Y," and its anode connected via a B-boost capacitor to the low potential terminal "S." Details of components and circuitry conventionally associated with yoke circuits, such as width and linearity controls, centering circuits, etc. have not been illustrated for the sake of simplifying the drawing.

In the high voltage supply of the illustrated color receiver which supply embodies the principles of the present invention, the anode of a first rectifier, diode 65, is connected to the high potential terminal "Z" of the output transformer 63. The high amplitude transient flyback pulses appearing at terminal "Z" are rectified by diode 65 and provide a high amplitude D.-C. potential at the diode 65's cathode, appearing across a capacitor 67 connected between the cathode and a point of reference potential (i.e. ground in the illustrative embodiment). The output terminal "U," to which the kinescope's ultor electrode is coupled, is directly connected to the cathode of diode 65. The desired degree of regulation of the supplied ultor voltage is insured by the use of a shunt regulator tube, triode 69, its anode being connected to output terminal "U" and its cathode being returned to the point of reference potential via a B+ supply (not shown). Control of the regulator 69 in accordance with ultor voltage variations is obtained by connecting the control grid of regulator 69 through resistance 71 to an adjustable point on a high voltage bleeder 75, connected between output terminal "U" and ground. The connection of the control grid of regulator 69 to the high voltage bleeder 75 is made by means of an adjustable tap 72 on the potentiometer 73, which serves as one of the series resistances making up bleeder 75. The static convergence voltage required by the convergence anode 49 of the kinescope 40 (when beam convergence is effected electrostatically) is also obtained from the high voltage bleeder 75 by means of the connection of the convergence output terminal "C" to the adjustable tap 76 of the potentiometer 77, which also serves as a series resistance portion of bleeder 75.

The novel focusing supply which cooperates with the previously described high voltage supply elements in accordance with the principles of the present invention shall now be described. The anode 83 of a grid-controlled rectifier, triode 81, is connected to an intermediate point "W" on the output transformer 63 of a flyback pulse potential appropriate to the desired range of focus voltage. The flyback pulses periodically appearing at point "W" are rectified by triode 81 and provide a D.-C. potential of the desired order at the triode's cathode 87, appearing across a capacitor 89 connected between cathode 87 and ground. The focus voltage output terminal "F," to which the focus electrodes 47 of the kinescope 40 are coupled, is directly connected to the cathode 87. The control grid 85 of rectifying triode 81 is made sensitive to ultor voltage variations by means of its connection to the adjustable tap 92 of potentiometer 93, which serves as a further series resistance portion of the aforementioned high voltage bleeder 75. A capacitor 91 is connected between control grid 85 and ground.

The capabilities of the thus described supply to provide the necessary tracking between the supplied focus and ultor voltages may best be described by considering in turn the various changing conditions which might be expected to alter the ultor-focus voltage ratio. First consideration may be given to changes in loading on the ultor supply, e.g. a change in picture content such as to increase the current drawn from the supply by the ultor electrode 50. Such a change is of course essentially regulated out by the action of the high voltage regulator 69. However, a small voltage drop of the ultor voltage must occur to operate the high voltage regulator 69. This drop in ultor voltage appears proportionally at the grid 85 of the focus rectifier 81, due to its "sensing" connection to bleeder 75, and applies more negative bias to the rectifying triode, reducing the rectifier current and dropping the focus voltage. A drop in focus voltage (which means a drop in the potential at cathode 87) acts like a change in bias in the positive direction for the triode 81. The bias changes in the negative direction (the change in control grid 85 potential) and in the positive direction (the change in cathode 87 potential) find their balance when essentially the same magnitude of current (as was drawn before the transient) is reached, i.e. essentially the same grid-cathode potential difference is established as before the transient. Therefore, focus voltage (potential at cathode 87) drops by substantially the same amount as the voltage derived from bleeder 75, a change which maintains the ratio of focus to ultor voltage at substantially the value determined by the original chosen setting of potentiometer tap 92. It will of course be appreciated that, similar to any practical regulated system, the above-described performance of the rectifying-regulating triode 81 will not exactly re-establish the previously existing grid-cathode potential difference but will rather result in some slight net change thereof, as particularly determined by the tube factors of triode 81 and the feedback factor of the control network. It may however be stated that for the reasonably anticipated range of ultor loading variations, the maximum resultant variation in focus-ultor voltage will be so slight as to be readily tolerable. It will be of course appreciated that the preceding explanation of the achievement of focus-ultor voltage tracking applies equally to decreases in the current drawn by the ultor electrode.

Changes in current drawn by the focus electrodes may next be considered. It will be appreciated that if the focus supply is well regulated, such changes should have little effect on the focus-ultor ratio. The desirable regulation characteristic obtained by use of a grid-controlled rectifier in the focus supply may be appreciated from a consideration of the following. Assuming for example that the change is an increase of focus current, the initial result is a drop in focus voltage. This means that the cathode 87 of the rectifier triode 81 becomes less positive, which is in effect a change of the grid-cathode bias in the positive direction. The triode rectifier 81 thus supplies more current, its forward resistance becomes smaller, and focus voltage tends to increase. The amount of difference between the drop in output voltage and the resultant opposing increase thereof depends essentially on the $g_m$ of the tube employed as rectifier 81. In a practical example, where a tube of the 2C53 type is employed as rectifier 81, the peak charging current delivered by triode 81 to capacitor 89 may be of the order of 3 milliamperes and the $g_m$ may be of the order of 1 milliampere per volt. Regulation of a focus voltage of the order of 3,000 volts within about .1% under such conditions, may thus be expected. It will thus be appreciated that such satisfactory regulation of the focus supply may be obtained through the above-described self-regulating operation of focus rectifier 81 that changes in loading of the focus supply will have essentially negligible effect on the focus-ultor voltage ratio.

Changes in the flyback source voltage will generally result in proportional changes in the flyback pulses applied to the rectifiers 65 and 81. There will be no resultant change in the grid-cathode bias of rectifier 81, since the potential of cathode 87 and the potential of control grid 83 (tied to bleeder 75) will change by essentially equal amounts. The focus-ultor voltage ratio will thus be maintained for such flyback source variations.

Changes in the ratio of flyback pulses applied to rectifiers 65 and 81 may occur, however, due to drifts of the distributed L, C, and R constants of the transformer 63 winding, during the warm-up period, for example, or due to different loading effects of the ultor and focus supplies on the various "ringing" frequency voltages present in the transformer 63. Considering for example an increase of the flyback potential applied to rectifier 81 relative to the flyback potential applied to rectifier 65, it will be appreciated that the resultant increase in potential of cathode 87 effectively changes the grid-cathode bias of rectifier 81 in a negative direction. The tube thus has more forward resistance, the rectifier supplies less current and focus voltage thus tends to decrease. Thus, similar to the conditions described with respect to changes in loading of the focus supply, an equilibrium condition is reached between the opposing effects on the output voltage as essentially determined by the $g_m$ of the tube employed as rectifier 81. Again, the residual voltage variation is of such small magnitude as to have an essentially negligible effect on the focus-ultor voltage ratio. It will also be appreciated that, similarly, any likely variations in tube characteristics will have little net effect on the focus-ultor voltage ratio.

From the above description of the operation of the described circuits under the various unsettling conditions which may be anticipated in such supplies, it will be appreciated that the present invention provides a voltage supply in which essentially constant-ratio tracking between two supplied voltages may be maintained under substantially all adverse conditions. The obtaining of such tracking results, while effectively using a single tube as both rectifier and regulator in the supply. The supplying of focus and ultor voltages to a color kinescope in a predetermined optimum ratio may thus be achieved with a high voltage supply having a minimum tube complement and a minimum of circuit components.

Having thus described our invention, what is claimed is:

1. In a cathode ray tube system, said cathode ray tube including a focus electrode and an ultor electrode, a high voltage supply for developing respective focus and ultor voltages for said focus and ultor electrodes comprising in combination a transformer, a first rectifying means coupled to an intermediate point on said transformer and having an output circuit, a second rectifying means coupled to a point on said transformer of higher potential than said intermediate point and also having an output circuit, said focus voltage being derived from said first rectifying means output circuit, said ultor voltage being derived from said second rectifying means output circuit, said first rectifying means comprising an electron discharge device including cathode, anode and control grid electrodes, and means for coupling said control grid electrode to said second rectifying means output circuit.

2. In a color television receiver including a color kinescope requiring a focusing voltage of a first order and an ultor voltage of a second higher order, said receiver also including a deflection wave output transformer subject to the periodic appearance of flyback pulses, a high voltage supply comprising in combination first rectifying means coupled to said transformer for developing a D.-C. potential of said first order from said periodic flyback pulses, second rectifying means coupled to said transformer for developing a D.-C. potential of said second order from said periodic flyback pulses, and means for controlling the development of said D.-C. potential of said first order by said first rectifying means in accordance with the output of said second rectifying means.

3. A high voltage supply in accordance with claim 2 including a high voltage bleeder shunting the output of said second rectifying means, and wherein said first rectifying means comprises an electron discharge device having a control grid, and said controlling means includes means for coupling said control grid to said high voltage bleeder.

4. In a color television receiver including a color kinescope having a focus electrode and an ultor electrode, said receiver including a horizontal deflection wave output transformer, a high voltage supply comprising in combination a first rectifier, said first rectifier having a cathode, an anode and a control grid, means for coupling said anode to said transformer, means for coupling said cathode to said focus electrode, a second rectifier having a pair of electrodes, means for coupling one of said second rectifier electrodes to a high potential terminal of said transformer, means for coupling the other of said rectifier electrodes to said ultor electrode, resistive means coupled between said ultor electrode and a point of reference potential, and means for coupling said first rectifier control grid to said resistive means.

5. A high voltage supply in accordance with claim 4 including a voltage regulating tube having a control electrode and being coupled between said ultor electrode and said point of reference potential, and means for coupling said control electrode to said resistive means.

6. In a color television receiver including a color kinescope having a focus electrode and an ultor electrode, said receiver also including a deflection wave output transformer, a high voltage supply for supplying respective focus and ultor voltages to said focus and ultor electrodes comprising in combination a focus rectifier coupled to said transformer, the output of said rectifier comprising said focus voltage, a high voltage rectifier also coupled to said transformer, the output of said high voltage rectifier comprising said ultor voltage, a high voltage bleeder shunting the output of said high voltage rectifier, and means for controlling the operation of said focus rectifier in accordance with a voltage derived from said high voltage bleeder.

7. In a color television receiver including a color kinescope comprising a focus electrode and an ultor electrode, said received also including a horizontal deflection wave output transformer and a regulated ultor voltage supply, a focus voltage supply comprising in combination an electron discharge device including an anode, a cathode, and a control grid, means for coupling said anode to said transformer, means for coupling said cathode to said focus electrode, and means for controlling the potential of said control grid in accordance with variations in the voltage supplied to said ultor electrode by said ultor voltage supply.

8. In a cathode ray tube system, said cathode ray tube including a focus electrode, a focus voltage supply comprising in combination a transformer, a rectifier, said rectifier having an anode, a cathode, and at least one grid electrode, means for coupling said anode to said transformer, means for supplying the output of said rectifier to said focus electrode as said focus voltage comprising a connection between said cathode and said focus electrode, and means for regulating said supplied focus voltage including a connection between said grid electrode and a reference point of a potential essentially independent of said supplied focus voltage.

9. Apparatus in accordance with claim 8 wherein said cathode ray tube also includes an ultor electrode, wherein said cathode ray tube system also includes an ultor voltage supply coupled to said transformer for supplying a unidirectional voltage to said ultor electrode, and wherein the potential of said reference point is proportional to the unidirectional voltage supplied to said ultor electrode by said ultor voltage supply.

10. In a television receiver including a cathode ray image reproducing tube having means for developing at least one cathode ray beam therein, said tube further having at least one electrode for accelerating the beam and at least one electrode for focusing the beam, a power supply for said electrodes including in combination, a transformer winding across which an alternating current potential appears, means including a first rectifier coupled across said winding to constitute a source of a first unidirectional potential of a selected value but subject to vary therefrom, means for impressing said potential on said accelerating electrode, potential divider means connected across said source for producing different potentials at various points thereon and each potential being subject to variation with variations in said first unidirectional potential, means including a second rectifier connected across a portion of said winding to constitute a second source of a second unidirectional potential, means for impressing said second unidirectional potential on said focusing electrode, control means included in said second source for controlling the value of said second unidirectional potential in response to a direct-current control potential applied thereto, and a connection extending from a point on said potential divider means to said control means to cause said second unidirectional potential to follow variations in said first unidirectional potential so as to maintain a predetermined relation therebetween.

11. In a television receiver including a cathode ray image reproducing tube having means for developing at least one cathode ray beam therein, said tube further having at least one electrode for accelerating the beam and at least one electrode for focusing the beam, a power supply for said electrodes including in combination, transformer winding across which an alternating current potential appears, means including a rectifier coupled across said winding to constitute a source of a first unidirectional potential of a selected value but subject to vary therefrom, means for impressing said potential on said accelerating electrode, potential divider means connected across said source for producing different potentials at various points thereon and each potential being subject to variation with variations in said first unidirectional potential, a second source of a second unidirectional potential, output circuit means for impressing said second unidirectional potential on said focusing electrode, an electron discharge device included in said second source and including a control electrode, and said discharge device further including an anode connected to an intermediate point on said transformer winding and a cathode connected to said output circuit means, said discharge device controlling the value of said second unidirectional potential in response to a direct current control potential applied to said control electrode, and a connection extending from a point on said potential divider means to said control electrode to cause said second unidirectional potential to follow variations in said first unidirectional potential so as to maintain a predetermined relation therebetween.

12. In a television receiver including a cathode ray image reproducing tube having means for developing at least one cathode ray beam therein, said tube further having at least one electrode for accelerating the beam and at least one electrode for focusing the beam, said receiver further including a sweep output transformer winding across which high-potential pulses are developed, a power supply for said electrodes including in combination, a source of a first unidirectional potential for the accelerating electrode, said potential having a selected value but subject to vary therefrom, and said source including a rectifying device coupled across the sweep output transformer winding, potential divider means connected across said source for producing different potentials at various points thereon and each potential being subject to variation with variations in said first unidirectional potential, a second source of a second unidirectional potential for the focusing electrode, an electron discharge device including a cathode, an anode and a control electrode included in said second source, means for impressing an exciting potential on said anode from an intermediate point on said transformer winding, circuit means for deriving said second unidirectional potential from said cathode, and a connection extending from a point on said potential divider means to said control electrode to cause said second unidirectional potential to follow variations in said first unidirectional potential to maintain a predetermined relation therebetween.

13. In a television receiver including a cathode ray image reproducing tube having means for developing at least one cathode ray beam therein, said tube further having at least one electrode for accelerating the beam and at least one electrode for focusing the beam, said receiver further including a sweep output transformer winding across which high-potential pulses are developed, a power supply for said electrodes including in combination, a source of a first unidirectional potential for the accelerating electrode, said potential having a selected value but subject to vary therefrom, and said source including a rectifying device coupled between one extremity of the sweep output transformer winding and a point of reference potential, potential divider means connected across said source for producing different potentials at various points thereon and each potential being subject to variation with variations in said first unidirectional potential, an electron discharge device having an anode, a cathode and a control electrode, means for connecting said anode to an intermediate point on the sweep output transformer winding, circuit means for deriving a second unidirectional potential for the focusing electrode from said cathode, and a connection extending from a point on said potential divider means to said control electrode to cause said second unidirectional potential to follow variations in said first unidirectional potential to maintain a predetermined relation therebetween.

14. The system defined in claim 13 in which said means for connecting said anode of said electron discharge device to an intermediate point on the sweep output transformer comprises a direct current connection, and in which said circuit means for deriving said second unidirectional potential comprises filter capacitor means coupled between said cathode and said point of reference potential.

15. In a television receiver including a cathode ray image reproducing tube having means for developing at least one cathode ray beam therein, said tube further having at least one electrode for accelerating the beam and at least one electrode for focusing the beam, said receiver further including a sweep output transformer winding across which high-potential pulses are developed, a power supply for said electrodes including in combination, a source of a first unidirectional potential for the accelerating electrode, said potential having a selected value but subject to vary therefrom, and said source including a rectifying device coupled between one extremity of the sweep output transformer winding and a point of reference potential, potential divider means connected across said source for producing different potentials at various points thereon and each potential being subject to variation with variations in said first unidirectional potential, a second source of a second unidirectional potential for the focusing electrode, said second source including a rectifying device comprising an electron discharge device having an anode, a cathode and a control electrode, means connecting said anode to an intermediate point on the sweep output transformer circuit means for deriving said second unidirectional potential from said cathode, and a connection extending from a point on said potential divider means to said control electrode to cause said second unidirectional potential derived from said cathode to follow variations in said first unidirectional potential to maintain a predetermined relation therebetween.

16. In a color television receiver including a cathode ray image reproducing tube having means for developing a plurality of cathode ray beams therein, an ultor electrode for accelerating the beams, a plurality of electrodes for focusing the beams, and an electrode for converging the beams, a power supply for said electrodes including in combination, a transformer winding across which an alternating current potential appears, means including a rectifier coupled across said winding to constitute a source of a first unidirectional potential of a selected value but subject to vary therefrom, means for impressing said potential on said ultor electrode, potential divider means connected across said source for producing different potentials at various points thereon and each potential being subject to variation with variations in said first unidirectional potential, means for connecting said converging electrode to one of said points on said potential divider means, means including a second rectifier coupled across a portion of said winding to constitute a second source of a second unidirectional potential, means for impressing said second unidirectional potential on said focusing electrode, a control means included in said second source for controlling the value of said second unidirectional potential in response to a direct-current control potential applied thereto, and a connection extending from a point on said potential divider means to said control means to cause said second unidirectional potential to follow variations in said first unidirectional potential to maintain a predetermined relation therebetween.

17. In a television receiver including a cathode ray image reproducing tube having means for developing at least one cathode ray beam therein, a screen impinged by the beam, and electrode means intermediate said beam developing means and said screen which focuses the beam, a power supply including in combination, a transformer winding across which an alternating current potential appears, means including a first rectifier coupled across said winding to constitute a source of a first unidirectional potential of a selected value but subject to vary therefrom, means for impressing said first potential on said screen, means including a second rectifier connected across a portion of said winding to constitute a second source of a second unidirectional potential, means for impressing said second unidirectional potential on said electrode means, control means included in said second source for controlling the value of said second unidirectional potential in response to a direct-current control potential applied thereto, and means for applying a potential related to said first potential to said control means to cause said second unidirectional potential to follow variations in said first unidirectional potential so as to maintain a predetermined relation therebetween.

References Cited in the file of this patent

UNITED STATES PATENTS

| | | |
|---|---|---|
| 2,565,621 | Olson | Aug. 28, 1951 |
| 2,577,112 | Duke | Dec. 4, 1951 |
| 2,588,652 | Nelson | Mar. 11, 1952 |
| 2,679,550 | Parker | Mar. 25, 1954 |